United States Patent
Pierrot et al.

(10) Patent No.: US 8,246,310 B2
(45) Date of Patent: Aug. 21, 2012

(54) TURBOMACHINE FAN

(75) Inventors: Arnaud Jean-Marie Pierrot, Le Mee sur Seine (FR); Stephane Rousselin, Hericy (FR)

(73) Assignee: SNECMA, Paris (FR)

( * ) Notice: Subject to any disclaimer, the term of this patent is extended or adjusted under 35 U.S.C. 154(b) by 1195 days.

(21) Appl. No.: 12/048,550

(22) Filed: Mar. 14, 2008

(65) Prior Publication Data

US 2008/0226458 A1 Sep. 18, 2008

(30) Foreign Application Priority Data

Mar. 16, 2007 (FR) .................................... 07 01903

(51) Int. Cl.
*F02C 3/00* (2006.01)
(52) U.S. Cl. .................................... 416/220 R
(58) Field of Classification Search ............. 416/220 R, 416/193 A, 248, 190, 221, 500, 219 R
See application file for complete search history.

(56) References Cited

U.S. PATENT DOCUMENTS

| | | | |
|---|---|---|---|
| 6,416,280 B1 * | 7/2002 | Forrester et al. | 416/94 |
| 6,422,820 B1 * | 7/2002 | Anderson et al. | 416/217 |
| 6,726,452 B2 * | 4/2004 | Strassberger et al. | 416/190 |
| 2004/0156719 A1 * | 8/2004 | Czachor | 415/209.4 |

FOREIGN PATENT DOCUMENTS

| | | |
|---|---|---|
| EP | 1 209 322 A2 | 5/2002 |
| EP | 1 746 249 A2 | 1/2007 |
| FR | 2 715 968 A1 | 8/1995 |
| FR | 2 814 495 A1 | 3/2002 |
| WO | WO 93/21425 | 10/1993 |

* cited by examiner

*Primary Examiner* — Edward Look
*Assistant Examiner* — Christopher R Legendre
(74) *Attorney, Agent, or Firm* — Oblon, Spivak, McClelland, Maier & Neustadt, L.L.P.

(57) ABSTRACT

A turbomachine fan including blades mounted in slots at the periphery of a rotor disk, and inter-blade platforms having radial lugs for fastening to corresponding lugs of the disk is disclosed. Each platform is fastened to the disk by a pin inserted into orifices in the lugs of the platform and into corresponding orifices in the lugs of the disk.

11 Claims, 2 Drawing Sheets

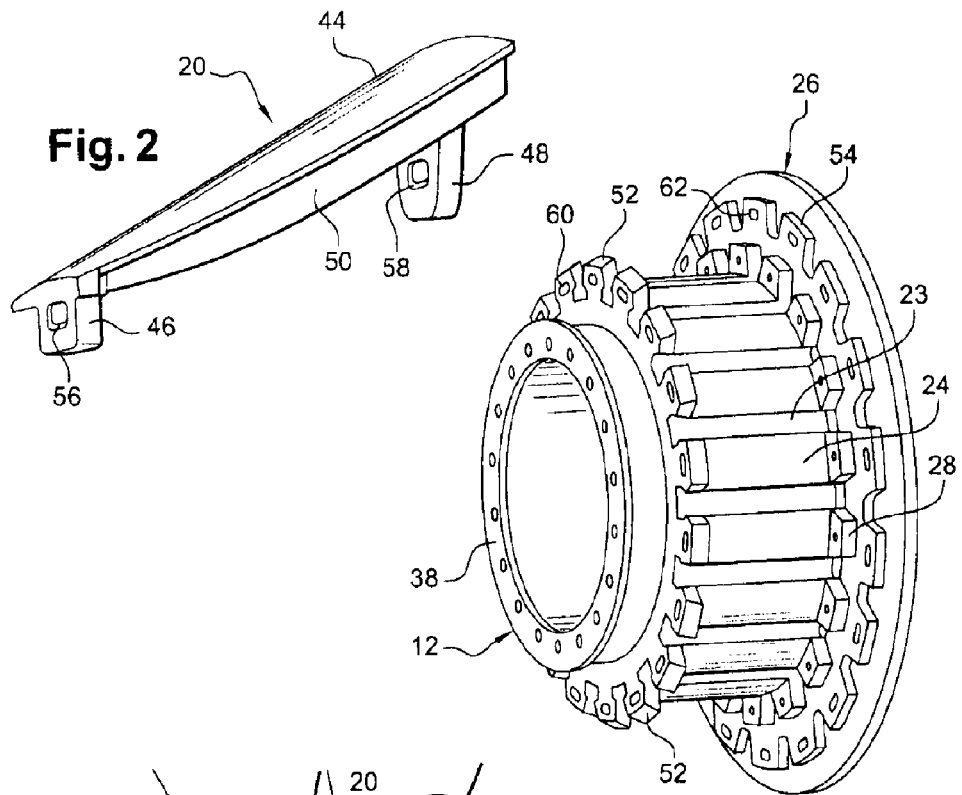
Fig. 2
Fig. 3
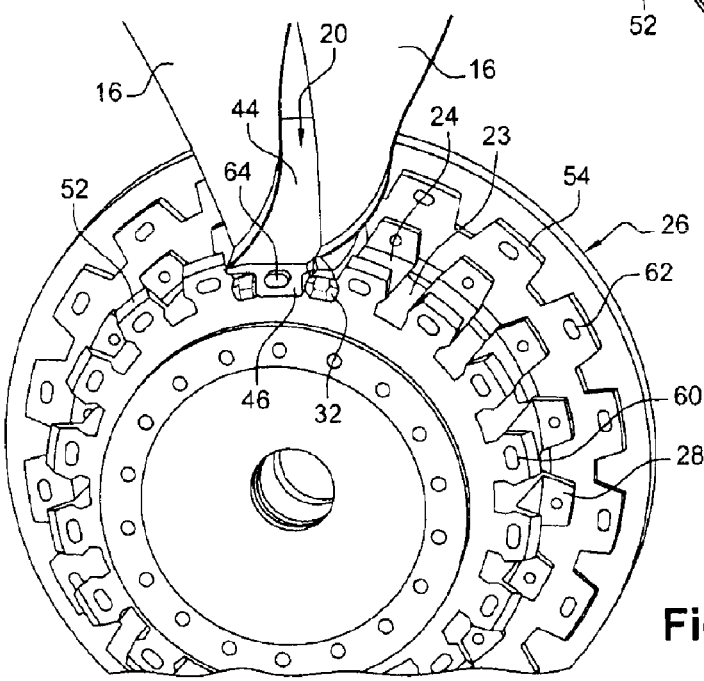
Fig. 4

TURBOMACHINE FAN

The present invention relates to a fan of a turbomachine, such as an aircraft turbofan or turboprop.

BACKGROUND OF THE INVENTION AND DESCRIPTION OF THE PRIOR ART

In a known manner, a turbomachine fan comprises a rotor disk bearing a plurality of blades whose roots are engaged and retained in substantially axial slots formed at the periphery of the disk. These blades are combined at their radially internal ends with platforms which internally define the annular flow path for the air stream entering the turbomachine.

Each blade of the fan may be formed in one piece with a platform. The blade is relatively heavy in that case, a factor which is manifested during operation by considerable mechanical stresses at the blade root, possibly causing cracks or splits to occur in this root. Moreover, the loss of a fan blade of this type results in significant damage in the turbomachine, and considerably increases the unbalance of the fan.

The fan blades and platforms may also be independent of one another. The platforms, termed inter-blade platforms, are then each attached and fastened to the fan disk between two adjacent blades. Each platform comprises internal radial lugs fastened to corresponding lugs of the disk by means of a number of systems of the nut and bolt type or pins mounted in orifices in the lugs of the platforms and in corresponding orifices in the lugs of the disk. These blades are not coupled to the platforms, thus making it possible to considerably reduce the mechanical stresses to which the blade roots are subjected during operation. It is then possible to reduce the size of the blade roots so as to lighten the fan and thus increase the performance of the turbomachine. Furthermore, in the event of losing a fan blade, the two platforms situated one on either side of the blade remain in place on the disk and do not cause any additional damage in the turbomachine. These two platforms additionally make it possible to protect the surrounding fan blades by preventing the debris from the lost blade coming into contact with the radially internal ends of the blades.

However, although the use of inter-blade platforms is advantageous for the reasons specified above, fastening these platforms by means of systems of the nut and bolt type or pins proves to be difficult, or even impossible, to achieve in the case of small engines having a diameter of around 1 m. The reason for this is that the fastening systems of the nut and bolt type are very bulky and cannot be used in a small-diameter engine. Furthermore, the interval between two adjacent fan blades and the space situated radially inside the platform are not sufficient to be able to manipulate the tools required to tighten these fastening systems. Manufacturers are thus constrained to use blades having integrated platforms in small-diameter engines.

SUMMARY OF THE INVENTION

A particular object of the invention is to provide a simple, economic and effective solution to these various problems while particularly allowing the use of inter-blade platforms in small-diameter engines.

Accordingly, the invention provides a turbomachine fan comprising a plurality of blades whose roots are mounted in slots at the periphery of a rotor disk, and inter-blade platforms having radial lugs for fastening to corresponding lugs of the disk, between the slots for mounting the blade roots, wherein each platform is fastened to the disk by means of a pin inserted into orifices in the lugs of the platform and into corresponding orifices in the lugs of the disk.

According to the invention, each inter-blade platform is fastened to the disk using a single component which extends substantially along the entire axial dimension of the platform and which is engaged substantially axially from upstream or downstream into orifices in the lugs of the platform and into corresponding orifices in the lugs of the disk. The pin is mounted from upstream or downstream of the fan and does not require the manipulation of a specific tool in the space situated radially inside the platform. It is thus possible to use inter-blade platforms on any type of engine, including those of small diameter.

Each of these platforms may comprise a radial lug at each of its upstream and downstream ends.

Advantageously, each platform bears axially and radially at its upstream end against an upstream lug of the disk, and at its downstream end against a lug of a downstream annular endplate added and fastened to the disk.

The upstream and downstream bearing contacts between the platform and the disk and between the platform and the annular endplate ensure the correct positioning of the platform on the disk and ensure that the orifices in the lugs of the platform are properly aligned with the orifices in the lugs of the disk and of the annular endplate.

Preferably, the pin is inserted from upstream into orifices in the lugs of the platform and of the disk and comprises at its upstream end a head which is kept applied against the upstream lug of the platform by means of an upstream annular endplate added and fastened to the disk.

The pin is thus immobilized axially by bearing axially against the upstream endplate and against the upstream lug of the platform. This immobilization does not require the use of specific tooling.

In the mounted position, the pin preferably extends obliquely with respect to the axis of rotation of the disk. It may for example extend downstream toward the outside.

The invention also relates to a turbomachine, such as an aircraft turbofan, which comprises a fan of the type described above.

The invention additionally relates to a pin for fastening an inter-blade platform to a disk of a fan as described above, which comprises a body of substantially cylindrical elongate rectilinear shape which is joined at one end to a head having a larger diameter or transverse dimension than the body.

The pin may be made of a strong lightweight material such as titanium or a composite.

BRIEF DESCRIPTION OF THE DRAWINGS

The invention will be better understood, and other details, advantages and features of the invention will become apparent, on reading the description given below by way of non-limiting example and with reference to the appended drawings, in which:

FIG. 2 is a perspective schematic view of an inter-blade platform of the fan shown in FIG. 1, as seen from upstream and from the side;

FIG. 3 is a schematic perspective view of the disk of the fan shown in FIG. 1, as seen from upstream and from the side;

FIG. 4 is another schematic perspective view of the fan disk shown in FIG. 1, as seen from upstream, and illustrates a step of assembling this fan.

DESCRIPTION OF THE PREFERRED EMBODIMENTS

Figure 1:
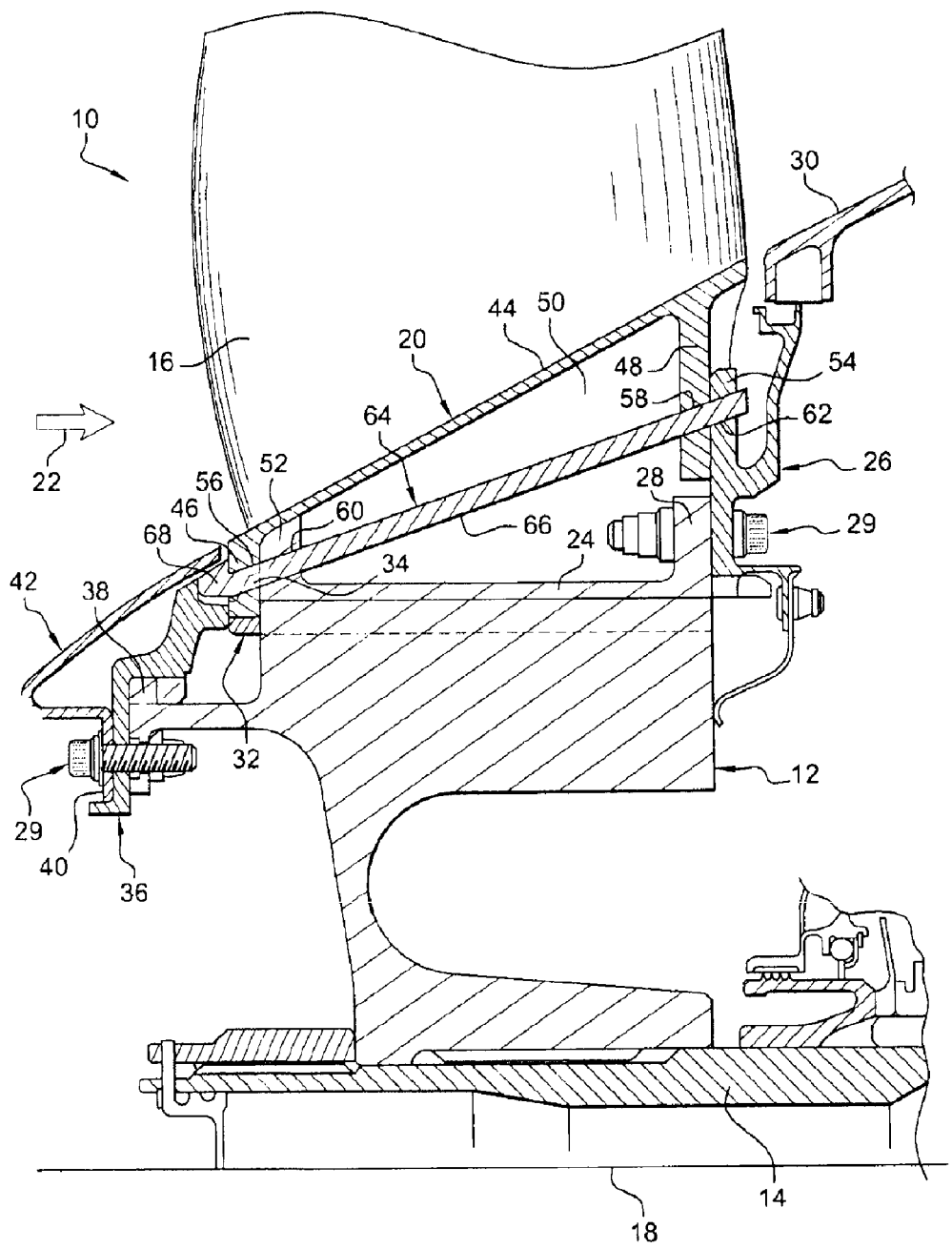
FIG. 1 is a partial schematic half-view in an axial section of a turbomachine fan according to the invention.

Reference will be made first of all to FIG. 1, which schematically represents a turbomachine fan 10 comprising a disk 12 which is mounted on the upstream end of a turbine shaft 14 and which, at its periphery, bears a plurality of blades 16 which are uniformly distributed about the axis 18 of rotation of the fan and between which inter-blade platforms 20 are mounted.

The blades 16 are surrounded externally by a nacelle (not shown) which, together with the platforms 20, defines an annular flow path for the air stream 22 entering the turbomachine.

At its periphery, the disk 12 comprises an alternating arrangement of slots 23 and ribs 24 extending longitudinally over the whole length of the disk 12 (FIG. 3). At their radially internal ends, the blades 16 comprise roots which are engaged axially from upstream into the slots 23 of the disk and which cooperate by shape coupling with these slots 23 so as to ensure that the blades 16 are retained radially on the disk 12. The blade roots have a dovetail shape, for example.

The blades 16 are retained axially downstream by an annular endplate 26 added and fastened to the downstream face of the disk 12. In the example represented, the end plate 26 is fastened to radially external downstream lugs 28 of the disk 12 using means 29 of the nut and bolt type. This downstream endplate 26 sealingly cooperates at its radially external end with an internal fan casing 30 which is aligned with the inter-blade platforms 20.

A shim 32 is inserted axially from upstream between the blade root and the bottom of the slot 23 to immobilize the blade 16 radially on the disk 12 (FIGS. 1 and 4). At its upstream end, this shim 32 comprises a radial lip 34 which bears axially against the upstream end of the blade root so as to axially retain the blade in the upstream direction. The shims 32 are immobilized axially by means of an upstream annular endplate 36 which is added and fastened to an upstream face of the disk 12 and which bears at its radially external end against the radial lips of the shims 32. The radially internal end of the upstream endplate 36 is interposed between an annular flange 38 of the fan disk, situated downstream, and an annular flange 40 of the inlet cone 42 of the turbomachine, situated upstream, and is clamped between these flanges 38, 40 using means 29 of the nut and bolt type. The inlet cone 42 is aligned with the inter-blade platforms 20.

Each platform 20 comprises a wall 44 of substantially circumferential orientation and two radial lugs 46, 48, one upstream and one downstream, which extend radially inwardly from the internal surface of the wall 44. The two lugs 46, 48 are interconnected by at least one longitudinal reinforcing rib 50 which extends from the upstream lug 46 to the downstream lug 48 along the internal surface of the wall 44 (FIG. 2).

Each platform 20 is positioned on a rib 24 of the disk 12, between two adjacent blades 16, and bears axially and radially against a radially external upstream lug 52 of the disk 12 and against a radially external lug 54 borne by the downstream endplate 26. More precisely, the lugs 46, 48 of the platform 20 bear axially in the downstream direction against the lugs 52, 54 of the disk 12 and of the downstream endplate 26, the wall 44 or the rib 50 of the platform 20 bears radially at its upstream end against the radially external end of the upstream lug 52 of the disk 12, and the rib 50 of the platform 20 bears radially at its downstream end against the radially external end of the lug 54 of the downstream endplate 26. These bearing contacts ensure correct positioning of the platform 20 on the root 24 of the disk 12, and axial alignment of the orifices 56, 58 in the lugs of the platform 20 with orifices 60, 62 in the lugs of the disk 12 and of the downstream endplate 26 (FIG. 1).

According to the invention, the platform 20 is immobilized on the rib 24 of the disk 12 by means of a pin 64 which is engaged substantially axially from upstream into the orifices 56, 58 in the lugs of the platform 20 and into the orifices 60, 62 in the lugs of the disk 12 and of the downstream endplate 26.

This pin 64 comprises a body 66 of elongate rectilinear shape which is substantially cylindrical and intended to extend through the aforementioned orifices 56, 58 60, 62, radially inside the platform 20. In the example represented, the pin 64 is inclined with respect to the axis 18 of rotation of the fan 10, and extends downstream toward the outside.

The body 66 of the pin 64 is joined at its upstream end to a head 68 having a larger diameter or larger transverse dimension than the body 66, this head 68 having a radial face oriented in the downstream direction and intended to butt against the upstream face of the lug 46 of the platform 20 so as to axially retain the platform 20 in the upstream direction. The head 68 of the pin 64 is immobilized in this position by means of the upstream endplate 36, which bears at its radially external end against the upstream end of the head 68 of the pin 64.

The fan 10 according to the invention is assembled in the following way: the downstream endplate 26 is fastened to the disk 12 using means 29 of the nut and bolt type (FIG. 3). The roots of the blades 16 are then engaged axially from upstream into the slots 23 of the disk until the blades 16 butt against the downstream endplate 26. The shims 32 are then inserted below the blade roots to immobilize the blades 16 radially on the disk 12 (FIG. 4). The platforms 20 are then mounted on the ribs 24 of the disk 12. Each platform 20 can be brought above a rib 24 of the disk 12 and then moved radially inwardly until the platform 20 bears axially and radially against the upstream lug 52 of the disk 12 and against the lug 54 of the downstream endplate 26. The pin 64 is engaged substantially axially from upstream through the orifices 56, 58 in the lugs 46, 48 of the platform 20 and through the orifices 60, 62 in the lugs of the disk 12 and of the endplate 26, until the upstream head 68 of the pin 64 butts against the upstream face of the upstream lug 46 of the platform 20 (FIGS. 1 and 4). The upstream endplate 36 is then added and fastened to the upstream flange 38 of the disk 12 in order to lock the assembly (FIG. 1).

Although the use of a fan 10 according to the invention proves to be particularly advantageous for small engines, it can equally be used for large engines. For this purpose, one or more additional radial lugs can be provided on the platform 20 and corresponding radial lugs can be provided on the rib 24 of the disk 12, these lugs having orifices through which the pin 64 passes. This makes it possible to limit the bending movements of the platform 20 during the operation of the turbomachine.

The disk 12 and the downstream annular endplate 26 can be made in one piece.

The platform 20 can be made from a material identical to that used for the blades 16, for example metal, or else from a strong lightweight material such as composite or a titanium.

The invention claimed is:

1. A turbomachine fan comprising:
    a plurality of blades having roots at their radially internal ends, the blade roots being mounted in slots at the periphery of a rotor disk; and inter-blade platforms having radial lugs for fastening to corresponding lugs of the disk between the slots for mounting the blade roots, wherein each platform is fastened to the disk by a single pin inserted into orifices in the lugs of the platform and into corresponding orifices in the lugs of the disk, each platform bearing axially and radially at its upstream end against an upstream lug of the disk and bearing axially at its downstream end against a lug of a downstream annular endplate added and fastened to the disk.

2. The fan as claimed in claim 1, wherein each platform comprises a radial lug at each of its upstream and downstream ends.

3. The fan as claimed in claim 1, wherein the pin is inserted from upstream into orifices in the lugs of the platform and of the disk and comprises at its upstream end a head which is applied and clamped against an upstream lug of the platform by an upstream annular endplate attached and fastened to the disk.

4. The fan as claimed in claim 1, wherein, in the mounted position, the pin extends obliquely with respect to an axis of rotation of the disk.

5. The fan as claimed in claim 4, wherein the pin extends downstream toward the outside with respect to the axis of rotation of the disk.

6. The fan as claimed in claim 1, wherein each platform includes an upstream lug, a downstream lug and a longitudinal rib extending from the upstream lug to the downstream lug, and the orifice in the downstream lug of each platform is disposed radially higher than the orifice in the upstream lug of each platform.

7. The fan as claimed in claim 1, wherein a radially external end of the downstream annular endplate sealingly cooperates with an internal fan casing.

8. A turbomachine, comprising a fan, the fan comprising:
a plurality of blades having roots at their radially internal ends, the blade roots being mounted in slots at the periphery of a rotor disk; and inter-blade platforms having radial lugs for fastening to corresponding lugs of the disk between the slots for mounting the blade roots, wherein each platform is fastened to the disk by a single pin inserted into orifices in the lugs of the platform and into corresponding orifices in the lugs of the disk, each platform bearing axially and radially at its upstream end against an upstream lug of the disk and bearing axially at its downstream end against a lug of a downstream annular endplate added and fastened to the disk.

9. A pin for fastening an inter-blade platform to a disk of a fan comprising a plurality of blades having roots at their radially internal ends, the blade roots being mounted in slots at the periphery of a rotor disk; and inter-blade platforms having radial lugs for fastening to corresponding lugs of the disk between the slots for mounting the blade roots, wherein each platform is fastened to the disk by a single pin inserted into orifices in the lugs of the platform and into corresponding orifices in the lugs of the disk, each platform bearing axially and radially at its upstream end against an upstream lug of the disk and bearing axially at its downstream end against a lug of a downstream annular endplate added and fastened to the disk, the pin comprises a body of substantially cylindrical elongate rectilinear shape which is joined at one end to a head having a larger diameter than the body.

10. The pin as claimed in claim 9, which is made of a strong lightweight material.

11. The pin as claimed in claim 10, wherein the pin is made of titanium or a composite.

* * * * *